Feb. 5, 1924.

M. F. EDWARDS 1,482,510

TIPPING GEAR FOR MOTOR ROAD VEHICLES

Filed Feb. 27, 1922  2 Sheets-Sheet 1

Inventor Maurice F. Edwards,
By Herbert W. Jenner,
Attorney.

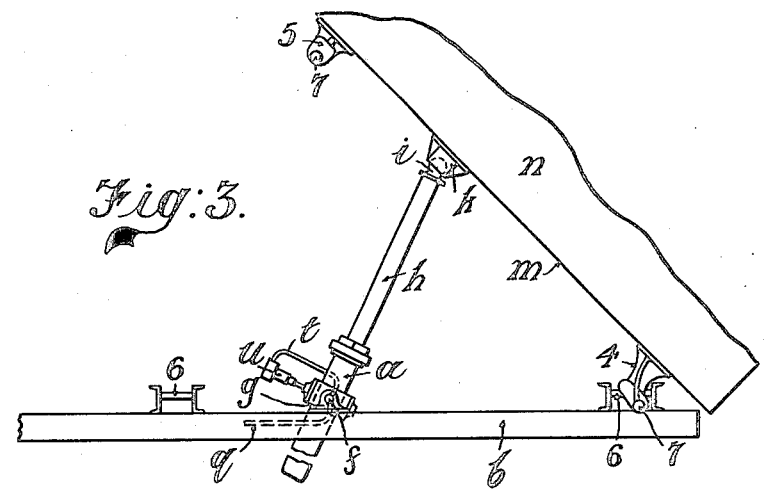
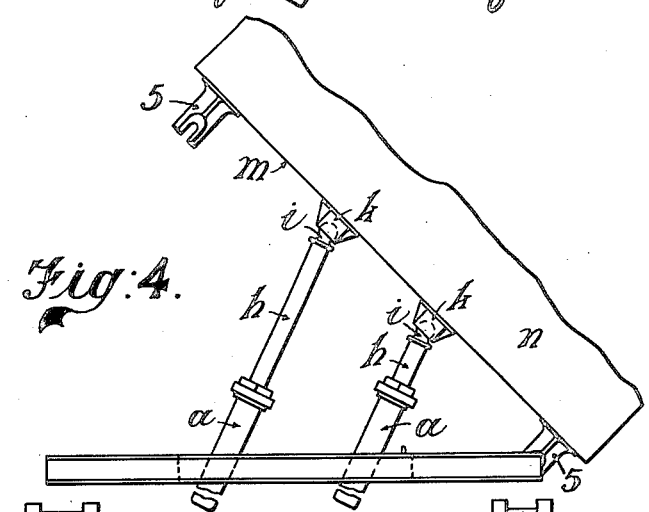
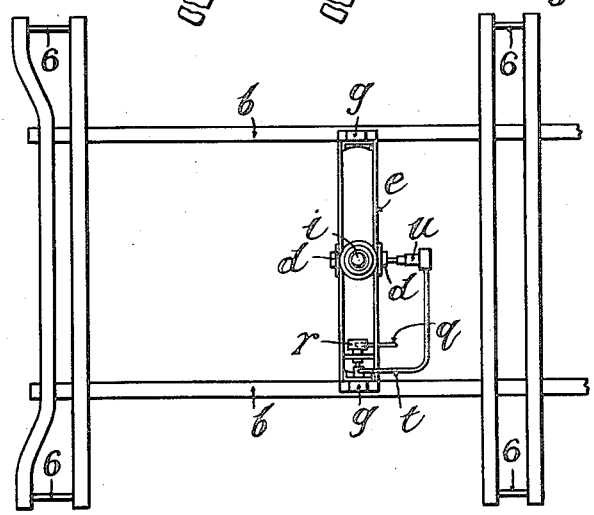

Patented Feb. 5, 1924.

1,482,510

UNITED STATES PATENT OFFICE.

MAURICE FRED EDWARDS, OF BOLTON, ENGLAND.

TIPPING GEAR FOR MOTOR ROAD VEHICLES.

Application filed February 27, 1922. Serial No. 539,804.

*To all whom it may concern:*

Be it known that I, MAURICE FRED EDWARDS, a subject of the King of Great Britain and Ireland, and resident of Bark Street, Bolton, England, have invented certain Improvements in Tipping Gears for Motor Road Vehicles, of which the following is a specification.

This invention relates to improvements in tipping gear of the fluid-operated type for the bodies of motor road vehicles, the object being to provide a simple form of mechanism of the class for tipping the body at each of its longitudinal sides or at the back in accordance with the position at which the load is to be delivered.

My invention consists essentially in one or a plurality of ram cylinders with it or their rams so mounted on the chassis frame and connected to the tipping body that the cylinder or cylinders can turn about an axial centre transversely of the body of the vehicle or frame and about an axial centre or centres at right angles to the other centre stuffing boxes connected with the liquid supply pipe of the pump and the ram cylinder or cylinders each having a part adapted to move about either of the centres referred to and hinging brackets connected with the tipping body and the chassis frame adapted to allow of the various tipping motions being carried out.

Figure 1:
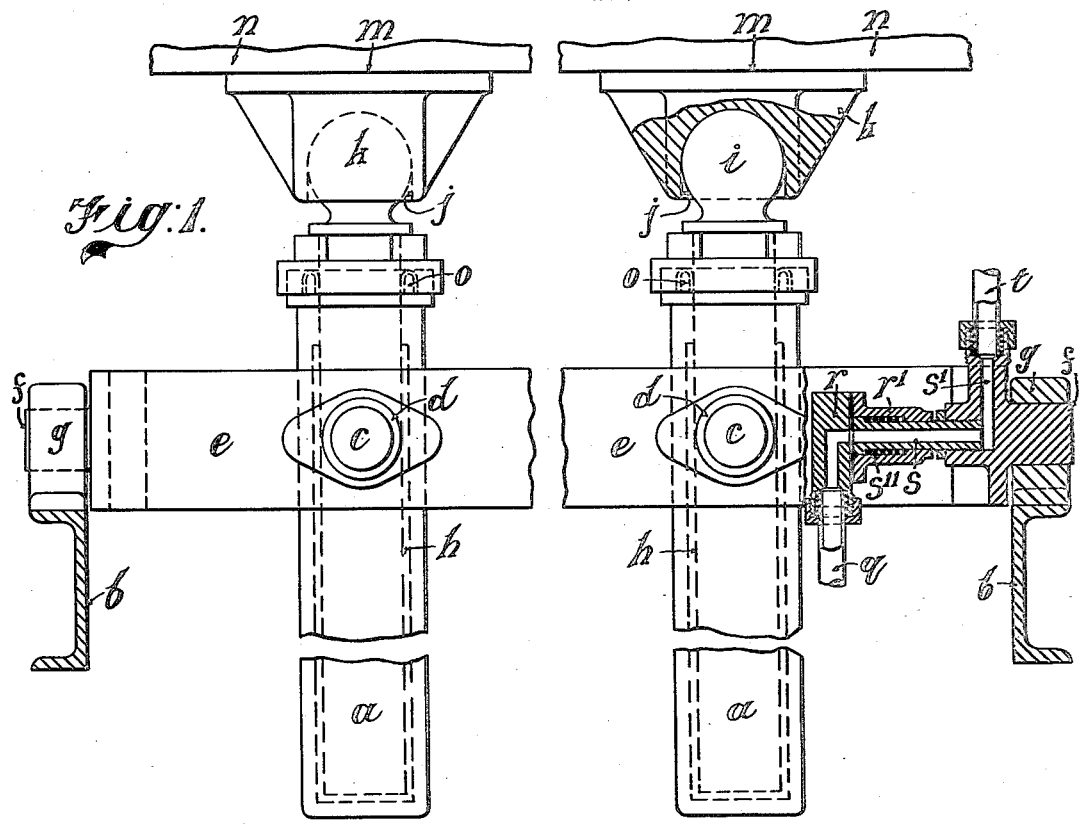
Figure 2:
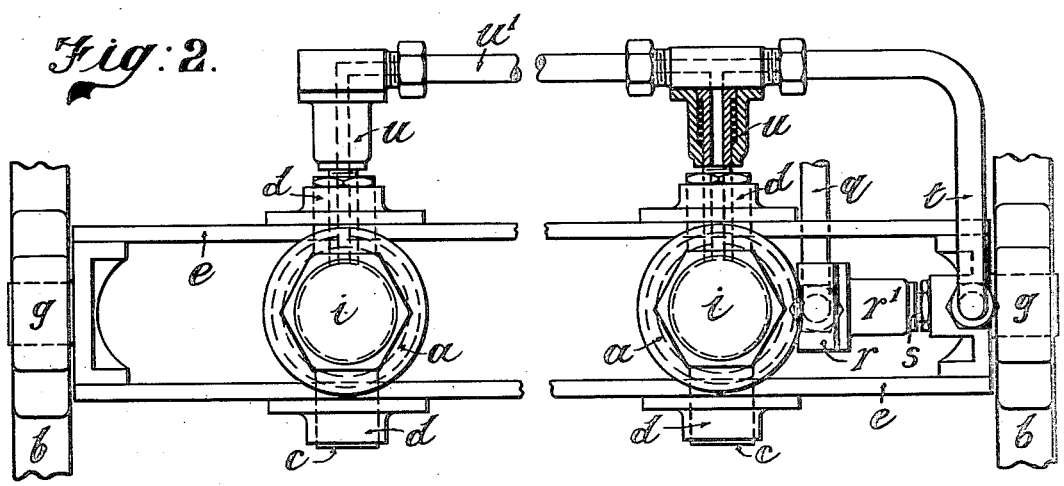

My invention will be fully described with reference to the accompanying drawings in which;

Fig. 1, is a side elevation of my improved tipping apparatus looking towards the rear of the vehicle to which it is applied;

Fig. 2, plan of same, partly in section;

Fig. 3, side elevation to a reduced scale showing the application of my invention to a motor vehicle body and indicating the latter tipping the load at the rear;

Fig. 4, end elevation showing the body tipping its load at one side and

Fig. 5, plan of part of a vehicle chassis showing a single ram and cylinder for tipping the vehicle body.

In carrying out my invention with reference to the aforesaid drawings, I employ two ram cylinders $a$ arranged side by side at a little distance from each other transversely of the chassis frame $b$, both cylinders having trunnions $c$ running longitudinally of the chassis frame, such trunnions being mounted in bearings $d$ in an open or skeleton frame $e$ provided at its ends with trunnions $f$ or pivots mounted in bearings $g$ supported by the chassis frame $b$. The cylinders $a$ are provided with rams $h$ the outer ends of which are coupled by any suitable form of universal joints with the underside of the tipping body. Thus in the drawings the rams have spherical ends $i$ engaging the hollow sockets $j$ of brackets $k$ secured to the base $m$ of the tipping body $n$ of the vehicle. The lower ends of the rams $h$ pass into the cylinders $a$ with which liquid-tight joints are made by any ordinary form of stuffing box $o$ or hydraulic packing. The arrangement of the cylinders $a$ on their trunnions $c$ and in the pivoted frame $e$ enables them to be turned either about the transverse axis of trunnions $f$ or the axes of trunnions $c$ running longitudinal of the chassis frame $b$. In line with the transverse trunnions $f$ is a stuffing box device connected with the liquid supply pipe $q$ of a force pump of any approved construction, that is to say having a stationary part or chamber $r$ coupled to the liquid-supply pipe $q$, from the pump. Chamber $r$ has bolted to it a sleeve or gland $r^1$ freely surrounding a pipe $s$ fixed by one end to the trunnion block $f$ and communicating therethrough by passage $s^1$ with pipe $t$. The opposite end of pipe $s$ is flanged. Packing $s^{11}$ surrounds the pipe and is automatically kept tight by the liquid pressure between the flange of pipe $s$ and the chamber $r$. Pipe $t$ communicates with two similarly-constructed stuffing box devices $u$, the pipes $u^1$ of which are fixed to the trunnions $c$ of cylinders $a$ with which they communicate. The arrangement of pipe $s$ and its stuffing-box device allows the rams and cylinders to move the pivoted frame $e$ with the pipe $t$ fixed to it about its axis as the vehicle body $n$ is raised for the rear tipping operation, and during its subsequent lowering to initial position, without interfering with the position of the liquid supply pipe $q$ from the known operating pump. The latter may be of any suitable type for controlling the flow of liquid to and from the ram cylinders. Stuffing boxes $u$ and their connections allow the cylinders and rams to move about the axis of the trunnions $c$ when the vehicle body is being tipped at either of its longitudinal sides.

In order to allow the tipping body $n$ to be turned about pivotal points arranged longitudinally of the body so as to tip the load at each side of the vehicle when required or at the rear of the vehicle I provide hinged bracket arrangements consisting of forked-shaped brackets, two marked 4 secured to the body n near its rear end at each side of the vehicle and two other brackets 5 in a position towards the forward end of the body, and on the chassis frame I arrange fixed pivot pins 6 running longitudinally of the frame. When the body is in the horizontal position the forked brackets pass freely over the pivot pins 6 and can normally be held down by removable pins 7 passed through holes in the ends of the forks below the pivot pins 6. These removable pins normally hold the body in the horizontal position and prevent its being tipped at all. On the other hand assuming it is desired to tip the load at the rear of the vehicle as in Fig. 3 the two removable pins towards the forward end of the body are withdrawn so that when the pump supplying the ram cylinders is put into operation the tipping body can move about the hinged joints at the rear of the vehicle, the forked brackets merely rolling upon the pivot pins whilst they are prevented rising by the removable pins being still kept in position. When it is desired to tip the load at one side of the vehicle as shown in Fig. 4 the removable pins at the front and rear on the opposite side are taken out and the other two left in so that on again operating the rams the body will be raised sideways. The same effect occurs when the pins on the opposite side of the vehicle are removed, the load being then tipped on the opposite side. In all the tipping operations referred to the rams and cylinders move quite freely in the desired directions as the tipping body is raised and lowered.

In all cases the position of the rams and cylinders is determined by the character of the transmission mechanism below the chassis. In some cases I may only employ one ram as shown in Fig. 5.

What I claim as my invention and desire to secure by Letters Patent is:—

1. In a tipping gear, a main supporting frame, a cross frame pivoted therein and provided with an axial supply passage for fluid, a hydraulic jack pivoted to rock in the cross frame crosswise of its pivots and provided with an axial supply passage for fluid, a supply pipe for fluid operatively connecting the axial supply passages of the cylinder and cross frame, a stuffing-box secured on the axis of the supply pivot of the cross frame and also provided with a supply passage for fluid, and means for connecting the other and stationary end portion of the stuffing-box with a supply pump.

2. In tipping gear of the fluid-operated type for the bodies of motor vehicles, bearings on the chassis frame, an open frame transversely of the latter having trunnions mounted in aforesaid bearings, a cylinder disposed between the longitudinal members of the open frame, trunnions on the cylinder disposed transversely of the frame, bearings in the frame to receive the trunnions a ram co-acting with the cylinder having its outer end connected by a universal joint to the vehicle body, stuffing box devices connected with the open frame and the trunnions of the ram cylinder each having a fixed and movable part and a liquid pressure supply pipe communicating with the stuffing box devices and ram cylinder, the whole arranged to allow the cylinder and ram to adapt its movements to the varied positions of the vehicle body.

In testimony whereof I have hereunto set my hand.

MAURICE FRED EDWARDS.